UNITED STATES PATENT OFFICE.

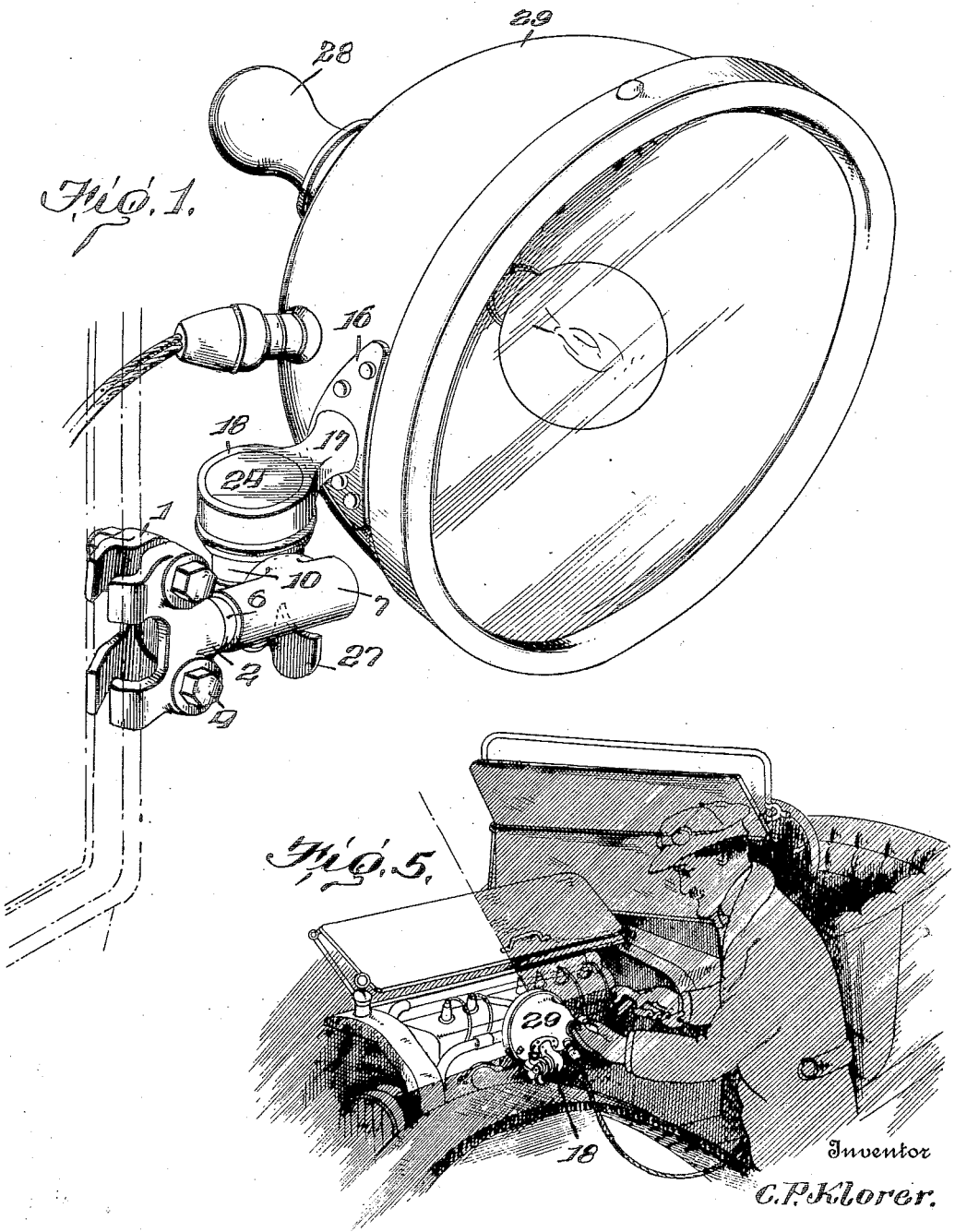

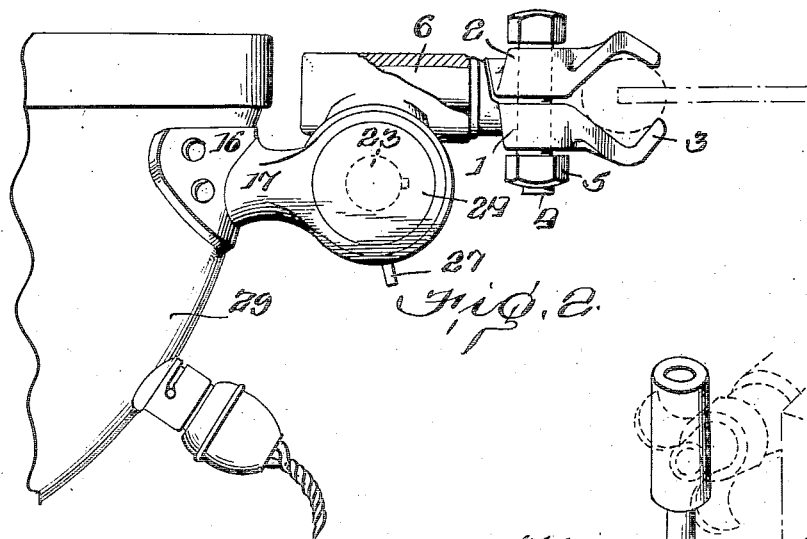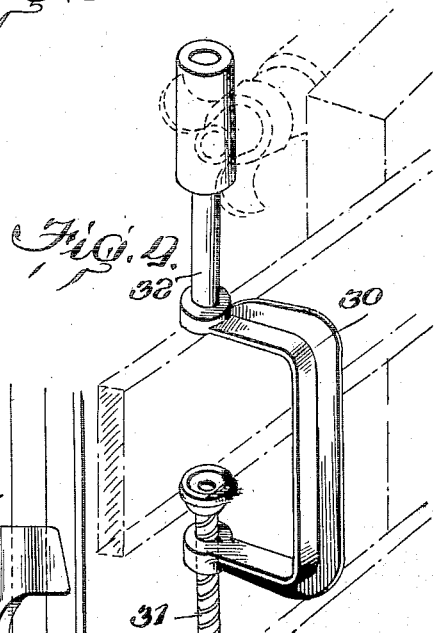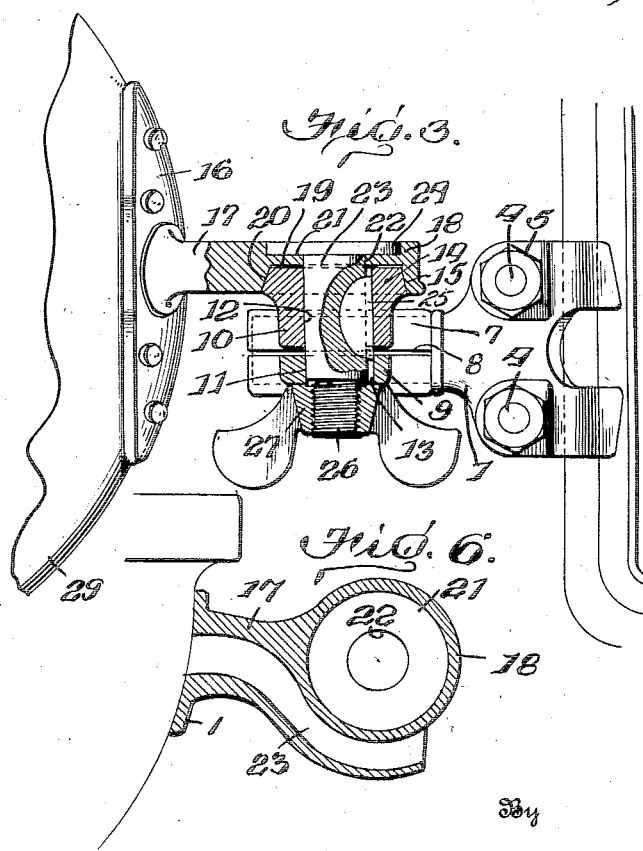

CHARLES P. KLORER, OF EAST CONEMAUGH, PENNSYLVANIA, ASSIGNOR OF TWO-THIRDS TO JOSEPH E. ZANG, OF JOHNSTOWN, PENNSYLVANIA.

JOINT FOR COMBINED SPOT-LIGHT AND TROUBLE LAMPS.

1,309,360.            Specification of Letters Patent.        Patented July 8, 1919.

Application filed December 6, 1916. Serial No. 135,380.

*To all whom it may concern:*

Be it known that I, CHARLES P. KLORER, a citizen of the United States, residing at East Conemaugh, in the county of Cambria and State of Pennsylvania, have invented certain new and useful Improvements in Joints for Combined Spot-Light and Trouble Lamps, of which the following is a specification.

This invention relates to adjustable brackets and while designed primarily for use in supporting an automobile spot light, the principles of the invention may find embodiment in brackets designed to support various other objects.

It is one aim of the invention to provide a bracket so constructed that the same may be readily mounted upon the wind shield, dash, or any other suitably located portion of an automobile and will support the spot light in such a manner that the same may have universal adjustment; that is to say, the spot light may be turned about both horizontal and vertical axes and may therefore be presented in any desired direction.

Another object of the invention is to so construct the bracket that whenever desired, the spot light may be readily and quickly dismounted and employed as a "trouble lamp" without, however, disturbing the connection of the attaching member of the bracket with the vehicle.

Another aim of the invention is to provide a bracket having interchangeable attaching members, one of which may be permanently secured in place upon the vehicle and the other of which may be readily and quickly applied to any object suitable for its support, such as a fence rail, or the like, thereby permitting of the lamp being dismounted from the vehicle and set up upon some support other than the vehicle and thus rendered useful where repairs are to be made at night.

Another object of the invention is to provide a bracket so constructed that when the nut provided for securing the members of the bracket in their positions of relative adjustment has been tightened, the same will be securely held against becoming accidentally loosened.

Another aim of the invention is to provide a bracket which will permit of the lamp being supported upon the vehicle in such manner that even should the nut mentioned above become loosened, the lamp may swing downwardly without likelihood of coming into contact with any portion of the vehicle which will be liable to damage the lamp.

Another aim of the invention is to so construct the bracket that adjustment of the lamp when employed as a spot light will not interfere in any way with the conductor wires leading to the lamp.

In the accompanying drawings:

Figure 1 is a perspective view of the bracket embodying the present invention illustrating the manner in which the same is to be employed in supporting a spot light;

Fig. 2 is a top plan view of the bracket;

Fig. 3 is a vertical sectional view through the bracket in a plane with the clamping bolt thereof;

Fig. 4 is a perspective view illustrating the auxiliary attaching member of the bracket;

Fig. 5 is a view illustrating the manner in which the lamp supported by the bracket may be employed as a trouble lamp.

Fig. 6 is a horizontal sectional view illustrating a slight modification of one member of the bracket.

Briefly stated, the bracket embodying the present invention comprises an attaching member, a member rotatably adjustable with relation thereto, a supporting member rotatably adjustable with relation to the second-mentioned member, and means for simultaneously securing the said members in their positions of relative adjustment, the adjustment of the members being about non-parallel axes.

The attaching member of the bracket comprises a two-part clamp, one of the parts being indicated by the numeral 1 and the other by the numeral 2, and these parts are provided each with a jaw portion, indicated by the numeral 3, and the parts are provided further with openings through which are passed clamping bolts 4 having nuts 5 threaded thereon. By reference to Fig. 2 of the drawings it will be understood that when the parts 1 and 2 are properly assembled with the jaws 3 thereof engaging opposite sides of the frame of a wind shield or any other part of the vehicle suitable for the support of the spot light, the nuts 5 may be tightened so as to firmly clamp the parts in place and the attaching member will then be rigidly held with relation to the portion of the vehicle to which it is applied. The member 1 is formed or provided with a laterally extending cylindrical post 6, the axis of which is preferably at right angles to the bolts 4. The post 6 may be solid or tubular as found desirable and rotatably fitted thereto is a split sleeve 7 constituting a portion of another member of the bracket, the split in the said sleeve being indicated by the numeral 8. In order that the sleeve may be caused to bind the post 6 and therefore be held at various positions of adjustment with relation to the post, the sleeve 7 is formed at the opposite sides of its split 8 with spaced lateral ears or extensions 9 and 10 provided respectively with apertures 11 and 12, the walls of which have alined key-ways 13 for a purpose to be presently explained. The ear 10 is formed with a bearing 14 having a conical bearing surface 15 which is concentric to the opening 12 in the said ear.

The supporting member of the bracket comprises an attaching plate 16 which is secured in any suitable manner to the side of the lamp casing and extending from this plate is a shank 17 terminating in a bearing head 18. In its under side the head 18 is formed with a socket 19 having a conical bearing wall 20. In its upper side the head 18 is formed with a recess 21 and the head is further formed with an opening 22 concentric to the socket 19 and recess 21. The clamping bolt of the bracket is indicated by the numeral 23 and is provided with a flat head 24 which rotatably seats within the recess 21 and is flush with the upper surface of the head 18, the shank of the bolt fitting rotatably within the opening 22 and extending through the openings 11 and 12 in the ears 9 and 10. The said shank of the bolt carries a key 25 which seats in the keyway 13 and consequently the bolt 23 is held against rotation within the said openings in the ears. At its lower end the shank of the bolt is reduced in diameter and threaded as indicated by the numeral 26 and fitted thereto is a wing nut 27 which, when tightened, bears against the under side of the ear 9 in the manner shown in Fig. 3 of the drawings.

From the foregoing description of the invention it will be understood that when the wing nut 27 is tightened it will bear firmly against the under side of the ear 9 and the head of the bolt will be caused to bear firmly against the upper side of the head 18, or more specifically, the bottom wall of the recess 21. As a result, the head 18 will have the bearing surface 20 of its socket 19 brought into binding contact with the bearing surface 15 of the conical bearing 14 and also the ear 10 will be drawn toward the ear 9. Therefore when the said nut is tightened, as stated, the sleeve 7 will be caused to firmly bind the post 6 and the head 18 will firmly bind against the bearing 14, and consequently, all of the several members comprising the bracket will be securely held against accidental disturbance of their relative adjustment. However, when it is desired to employ the lamp as a spot light the handle 28 of the spot lamp which is indicated by the numeral 29, may be grasped and the lamp turned to throw its rays in the desired direction. It will be apparent, furthermore, that as that member of the bracket including the sleeve 7 is rotatably adjustable about a horizontal axis and the supporting member 19 is rotatably adjustable about a vertical axis, the light may be turned to throw its rays upon an object in any direction, within any radius of a circle either horizontally or vertically. Should it be desired to employ the lamp as a trouble lamp in the manner shown in Fig. 5 of the drawings, for example, it is only necessary to loosen the wing nut 27 and then slip the sleeve 7 from the post 6. In this manner the lamp may be dismounted without, however, in any way disturbing the connection of the attaching member of the bracket with the vehicle and, when the lamp is no longer to be employed as a trouble lamp, it may be readily remounted.

By providing an auxiliary attaching member, such as clearly shown in Fig. 4 of the drawings, the lamp may be readily supported upon a fence rail, tree limb, or any other object adjacent the machine and adjusted so that its rays will fall upon the part of the machine undergoing repairs. The said auxiliary bracket comprises the well known U-frame 30, one end of which constitutes a fixed clamping jaw and the other end of which supports a clamping screw indicated by the numeral 31. The first mentioned end of the frame 30 is provided with an upstanding post 32 which is of the same diameter as the post 6. It will now be apparent that after the sleeve 7 has been slipped from engagement with the post 6 it may be fitted on to the post 32.

In Figs. 1 and 2 the conductor wires for the lamp 29 are illustrated as connected to the usual socket provided at one side of the casing for the lamp. However, if desired the supporting member of the bracket may be formed with a passage-way 33 extending along one side thereof through which the conductor wires may be threaded.

It will be understood that inasmuch as the split sleeve 7 is resilient, when the nut 27 is tightened it will be firmly held against accidental loosening due to the fact that the ear 9 will firmly bind against it.

Having thus described the invention, what is claimed as new is:

1. In a device of the class described, an attaching member having a post, a member having a resilient split sleeve fitting the said post and provided at the opposite sides of its split with extensions having alined apertures offset with respect to the longitudinal plane of the post for the passage of a clamping bolt, one of said extensions having a bearing, a supporting member having a laterally enlarged portion disposed in alinement with the extensions and provided with a socket to receive the bearing, a bolt fitted through the said extensions and through an opening in the enlarged portion of the supporting member, and a nut threaded upon the bolt and arranged when tightened to cause the said split sleeve to bind the said post and simultaneously to bind the bearing in the said socket, the tendency of the said sleeve to open serving to prevent backward turning of the nut.

2. In a device of the class described, an attaching member having a post, a member including a sleeve split longitudinally and rotatably adjustably fitted to the post, the said sleeve being provided at the opposite sides of its slit with spaced extensions formed with alined apertures offset with respect to the longitudinal plane of the post, one of said extensions having a conical bearing surface, a supporting member provided in one side with a conical bearing socket, the wall of which coacts with the said conical bearing surface, the said supporting member having an aperture axially alined and communicating with the bearing socket and being formed opposite the said socket with a recess, a bolt fitted through all of the said apertures and having a head seating in the recess in the supporting member, and a nut threaded upon the bolt and bearing against the other one of the said spaced extensions of the second-mentioned member.

3. In a device of the class described, an attaching member having a post at one end and a clamp at the other for detachable engagement with a support, a split sleeve rotatably adjustable on the post and provided with spaced lateral extensions having apertures therein and offset with respect to the longitudinal plane of the post, a supporting member mounted for rotation on one of the extensions, a bolt extending through the supporting member and through the apertures in the extensions, and means engaging the lower end of the bolt for simultaneously clamping the split sleeve in engagement with the post, and the supporting member in engagement with the adjacent extension.

In testimony whereof I affix my signature.

CHARLES P. KLORER. [L. S.]